(12) United States Patent
Shinomiya

(10) Patent No.: US 11,824,185 B2
(45) Date of Patent: Nov. 21, 2023

(54) NEGATIVE ELECTRODE FOR NONAQUEOUS ELECTROLYTE SECONDARY BATTERY AND NONAQUEOUS ELECTROLYTE SECONDARY BATTERY

(71) Applicant: SANYO Electric Co., Ltd., Daito (JP)

(72) Inventor: Takuya Shinomiya, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 353 days.

(21) Appl. No.: 16/617,968

(22) PCT Filed: May 24, 2018

(86) PCT No.: PCT/JP2018/019934
§ 371 (c)(1),
(2) Date: Nov. 27, 2019

(87) PCT Pub. No.: WO2018/225515
PCT Pub. Date: Dec. 13, 2018

(65) Prior Publication Data
US 2020/0119336 A1 Apr. 16, 2020

(30) Foreign Application Priority Data

Jun. 9, 2017 (JP) ................................ 2017-114431

(51) Int. Cl.
*H01M 4/133* (2010.01)
*H01M 4/36* (2006.01)
*H01M 4/02* (2006.01)

(52) U.S. Cl.
CPC ........... *H01M 4/364* (2013.01); *H01M 4/133* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2012/0315546 A1* 12/2012 Kaneko ................. H01M 4/362
429/303
2014/0186702 A1* 7/2014 Takahata ............... H01M 4/364
429/211

(Continued)

FOREIGN PATENT DOCUMENTS

CN 106058154 A 10/2016
JP H 11199211 * 7/1999 ............. C01B 31/04

(Continued)

OTHER PUBLICATIONS

English translation of JPH 11199211 (Year: 1999).*

(Continued)

*Primary Examiner* — Yoshitoshi Takeuchi
(74) *Attorney, Agent, or Firm* — WHDA, LLP

(57) ABSTRACT

The present disclosure aims to provide a nonaqueous electrolyte secondary battery having excellent discharge load characteristics and excellent long-term cycle characteristics. A nonaqueous electrolyte secondary battery which is one example of an embodiment of the present disclosure includes a positive electrode, a negative electrode (30), separators, and a nonaqueous electrolyte. The negative electrode (30) includes a negative electrode collector (31) and a negative electrode mixture layer (32) formed on the negative electrode collector (31). The negative electrode mixture layer (32) includes a first mixture layer primarily composed of a carbon-coated graphite (35) and a second mixture layer (34) primarily composed of a graphite (36), the first mixture layer (33) is disposed at a surface side of the negative electrode mixture layer (32), and the second mixture layer (34) is disposed at a side of the negative electrode collector (31).

6 Claims, 2 Drawing Sheets

(56) References Cited

U.S. PATENT DOCUMENTS

2017/0125806 A1* 5/2017 Wang .................. H01M 4/48
2018/0115015 A1 4/2018 Inque et al.

FOREIGN PATENT DOCUMENTS

| | | |
|---|---|---|
| JP | 2002-216757 A | 8/2002 |
| JP | 2005-294011 A | 10/2005 |
| JP | 2006-59704 A | 3/2006 |
| JP | 2013-89327 A | 5/2013 |
| JP | 2015-18663 A | 1/2015 |
| JP | 2015-185491 A | 10/2015 |
| WO | 2012/090728 A1 | 7/2012 |
| WO | 2013/018182 A1 | 2/2013 |
| WO | 2016/035289 A1 | 3/2016 |
| WO | WO-2016035289 A1 * | 3/2016 ........ H01M 10/0525 |
| WO | 2016/152991 A1 | 9/2016 |

OTHER PUBLICATIONS

Translation of International Search Report dated Aug. 21, 2018, issued in counterpart Application No. PCT/JP2018/019934. (2 pages).

* cited by examiner ary battery, the negative electrode comprising a negative electrode collector and a negative electrode mixture layer formed on the negative electrode collector. In the negative electrode described above, the negative electrode mixture layer includes a first mixture layer primarily composed of a graphite coated with an amorphous carbon and a second mixture layer primarily composed of a graphite coated with no amorphous carbon, the first mixture layer is disposed at a surface side of the negative electrode mixture layer, and the second mixture layer is disposed at a side of the negative electrode collector.

NEGATIVE ELECTRODE FOR NONAQUEOUS ELECTROLYTE SECONDARY BATTERY AND NONAQUEOUS ELECTROLYTE SECONDARY BATTERY

TECHNICAL FIELD

The present disclosure relates to a negative electrode for a nonaqueous electrolyte secondary battery and a nonaqueous electrolyte secondary battery.

BACKGROUND ART

In nonaqueous electrolyte secondary batteries, such as a lithium ion battery, the use of graphite as a negative electrode active material has been widely known. For example, in order to improve the safety during rapid charge and cycle characteristics, PTL 1 has disclosed a nonaqueous electrolyte secondary battery including a negative electrode which contains as a negative electrode active material, a mixture formed of coated graphite particles, the surfaces of which are coated with an amorphous carbon, and non-coated graphite particles, the surfaces of which are coated with no amorphous carbon.

CITATION LIST

Patent Literature

PTL 1: Japanese Published Unexamined Patent Application No. 2005-294011

SUMMARY OF INVENTION

Technical Problem

Incidentally, in nonaqueous electrolyte secondary batteries, improvement in discharge load characteristics and long-term cycle characteristics is an important subject. In the nonaqueous electrolyte secondary battery disclosed in PTL 1, the discharge load characteristics and the long-term cycle characteristics are still required to be improved.

Solution to Problem

A negative electrode for a nonaqueous electrolyte secondary battery according to one aspect of the present disclosure is a negative electrode for a nonaqueous electrolyte secondary battery, the negative electrode comprising a negative electrode collector and a negative electrode mixture layer formed on the negative electrode collector. In the negative electrode described above, the negative electrode mixture layer includes a first mixture layer primarily composed of a graphite coated with an amorphous carbon and a second mixture layer primarily composed of a graphite coated with no amorphous carbon, the first mixture layer is disposed at a surface side of the negative electrode mixture layer, and the second mixture layer is disposed at a side of the negative electrode collector.

A nonaqueous electrolyte secondary battery according to another aspect of the present disclosure comprises: the negative electrode described above, a positive electrode, and a nonaqueous electrolyte.

Advantageous Effects of Invention

According to the negative electrode for a nonaqueous electrolyte secondary battery, which is the aspect of the present disclosure, a nonaqueous electrolyte secondary battery having excellent discharge load characteristics and excellent long-term cycle characteristics can be provided.

DESCRIPTION OF EMBODIMENTS

As a method to improve discharge load characteristics (output characteristics) of a nonaqueous electrolyte secondary battery, the use of a graphite coated with an amorphous carbon as a negative electrode active material has been considered. However, when a carbon-coated graphite is used, there have been problems in that an adhesive property between a negative electrode mixture layer and a negative electrode collector is degraded, and an electrically conductive property is degraded. The degradation in electrically conductive property as described above causes an increase in resistance during long-term cycles, and the output characteristics are also adversely influenced. On the other hand, when soft particles, such as a natural graphite, are used, although a preferable adhesive property between the negative electrode mixture layer and the negative electrode collector can be obtained, since the particles are crushed and oriented in a rolling step of electrode production, a decrease in diffusion property of lithium ions in the negative electrode mixture layer and a serious degradation in output characteristics may disadvantageously occur.

Through intensive research to solve the problems described above, the present inventor succeeded in simultaneously achieving excellent discharge load characteristics and long-term cycle characteristics by using a negative electrode mixture layer which includes a first mixture layer primarily composed of a carbon-coated graphite and a second mixture layer primarily composed of a graphite coated with no amorphous carbon, the first mixture layer being disposed at a surface side of the negative electrode mixture layer, the second mixture layer being disposed at a side of a negative electrode collector. According to a negative electrode including the negative electrode mixture layer described above, a nonaqueous electrolyte secondary battery simultaneously having excellent discharge load characteristics and long-term cycle characteristics can be provided.

Hereinafter, as one example of the embodiment, there will be described a nonaqueous electrolyte secondary battery 10 which is a laminate battery including an exterior body formed of at least one laminate sheet containing a resin sheet and a metal layer; however, the nonaqueous electrolyte secondary battery of the present disclosure is not limited thereto. The nonaqueous electrolyte secondary battery of the present disclosure may be a cylindrical battery including a cylindrical metal case, a prismatic battery including a prismatic metal case, or the like.

Figure 1:
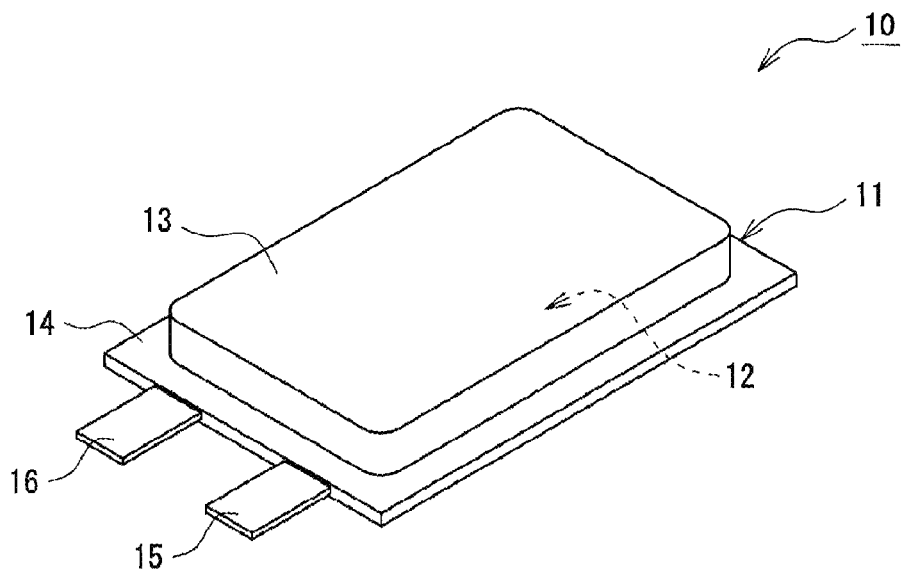
FIG. 1 is a perspective view of a nonaqueous electrolyte secondary battery which is one example of an embodiment.
Figure 2:
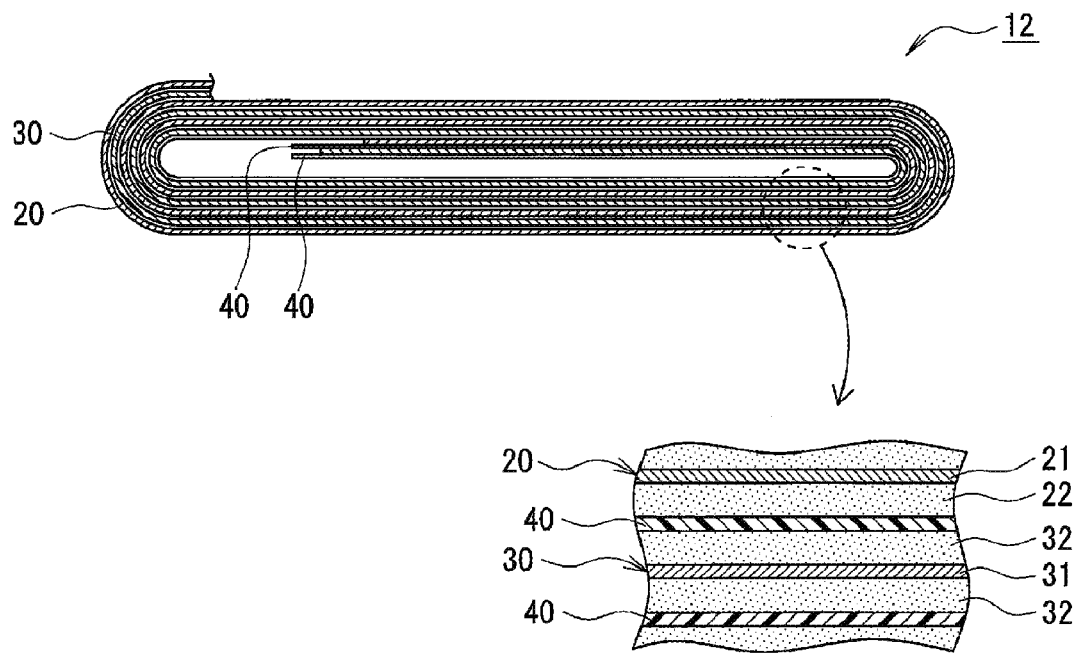
FIG. 2 is a cross-sectional view of an electrode body which is one example of the embodiment.

FIG. 1 is a perspective view of the nonaqueous electrolyte secondary battery 10 which is one example of the embodiment, and FIG. 2 is a cross-sectional view of an electrode body 12 forming the nonaqueous electrolyte secondary battery 10. As shown in FIGS. 1 and 2 by way of example, the nonaqueous electrolyte secondary battery 10 includes an exterior body 11 and a power generation component received in the exterior body 11. One preferable example of the nonaqueous electrolyte secondary battery 10 is a lithium ion battery. The power generation component is formed of the electrode body 12 and a nonaqueous electrolyte. As shown in FIG. 2 by way of example, the electrode body 12 includes a positive electrode 20, a negative electrode 30, and separators 40 and has a structure in which the positive electrode 20 and the negative electrode 30 are spirally wound with the separators 40 interposed therebetween. In addition, the electrode body may have a structure in which a plurality of positive electrodes and a plurality of negative electrodes are alternately laminated to each other with separators interposed therebetween.

The nonaqueous electrolyte contains a nonaqueous solvent and an electrolyte salt dissolved in the nonaqueous solvent. As the nonaqueous solvent, for example, there may be used a cyclic carbonate, such as ethylene carbonate (EC) or propylene carbonate (PC); a chain carbonate, such as dimethyl carbonate (DMC) or ethyl methyl carbonate (EMC); a cyclic ether, a chain ether, a carboxylic acid ester, a nitrile, an amide, or a mixed solvent containing at least two of the solvents mentioned above. As the nonaqueous solvent, there may be also used a halogen-substituted compound (such as 4-fluoroethylene carbonate) which is obtained by substituting at least one hydrogen of each of the solvents mentioned above with a halogen atom, such as fluorine. The electrolyte salt is preferably a lithium salt, such as $LiBF_4$ or $LiPF_6$.

The exterior body 11 is formed by laminating two laminate sheets. The laminate sheets each have a laminate structure in which at least one resin sheet (resin layer) is laminated on each of two surfaces of a metal layer, and in each sheet, resin layers to be in contact with each other are each preferably formed of a thermally fusible resin. The metal layer is a thin film layer primarily composed of aluminum or the like and has a function to prevent permeation of moisture and the like.

The exterior body 11 includes a receiving portion 13 receiving the power generation component described above and a sealing portion 14 formed along a periphery of the receiving portion 13. One of the laminate sheets forming the exterior body 11 is formed to have a cup shape so that a flat and approximately parallelepiped receiving portion 13 is formed in this sheet. The receiving portion 13 is formed by, for example, drawing of one laminate film so as to have a convex shape at a side opposite to the other laminate sheet which is disposed to face the laminate sheet described above. The sealing portion 14 is formed by thermal welding between peripheral portions of the two laminate films, so that the inside space of the receiving portion 13 in which the power generation component is received is closely sealed.

The nonaqueous electrolyte secondary battery 10 includes a pair of electrode terminals (a positive electrode terminal 15 and a negative electrode terminal 16) extended from the exterior body 11. The positive electrode terminal 15 and the negative electrode terminal 16 are extended from one end of the exterior body 11 in a longitudinal direction. The positive electrode terminal 15 and the negative electrode terminal 16 are each an approximately flat plate-shaped body, are bonded to the laminate films at the sealing portion 14, and are extended outside of the exterior body 11 between the two laminate sheets.

The electrode body 12 is preferably formed to have a flat shape so as to be efficiently received in the receiving portion 13. The flat shape of the electrode body 12 is formed by spirally winding the respective electrodes and the separators 40 to form a hollow cylindrical shape, followed by pressure-crushing of the hollow cylinder in a radius direction. Alternatively, the electrode body 12 may be formed by winding the respective electrodes and the separators 40 so as to have a flat shape. The positive electrode 20 has an exposing portion at which the surface of a positive electrode collector 21 is exposed, and the positive electrode terminal 15 is connected to this exposing portion. Alternatively, after an electrically conductive member is connected to the exposing portion, the positive electrode terminal 15 may be connected to this electrically conductive member. The same as described above may also be applied to the negative electrode 30, that is, the negative electrode terminal 16 may be connected to an exposing portion of a negative electrode collector 31, or the negative electrode terminal 16 may be connected to an electrically conductive member connected to the exposing portion.

Figure 3:
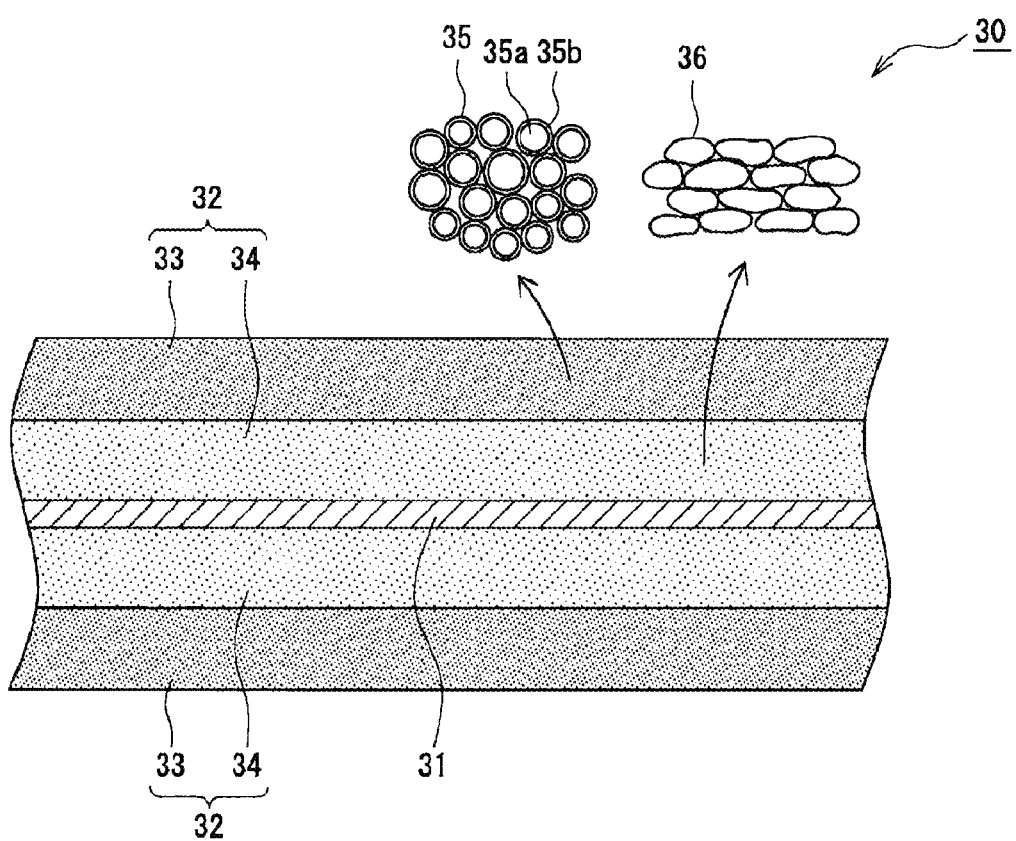
FIG. 3 is a cross-sectional view of a negative electrode which is one example of the embodiment.

Hereinafter, with appropriate reference to FIGS. 2 and 3, the constituent elements (the positive electrode 20, the negative electrode 30, and the separator 40) of the electrode body 12 will be described, and in particular, the negative electrode 30 will be described in detail. FIG. 3 is a cross-sectional view of the negative electrode 30 which is one example of the embodiment.

[Positive Electrode]

As shown in FIG. 2 by way of example, the positive electrode 20 includes the positive electrode collector 21 and at least one positive electrode mixture layer 22 formed on the positive electrode collector 21. As the positive electrode collector 21, for example, foil of a metal, such as aluminum, stable in a potential range of the positive electrode 20 or a film having a surface layer formed of the metal mentioned above may be used. The positive electrode mixture layer 22 contains a positive electrode active material, an electrically conductive agent, and a binding agent. The positive electrode 20 may be formed by forming the positive electrode mixture layer 22 on each of two surfaces of the positive electrode collector 21, for example, in such a way that after a positive electrode mixture slurry containing the positive electrode active material, the electrically conductive material, the binding agent, and the like is applied on the positive electrode collector 21 to form coating films, the coating films thus formed are dried and are then rolled.

The positive electrode active material contains at least one lithium transition metal oxide as a primary component. The positive electrode active material may be substantially formed only from a lithium transition metal oxide or may be formed, for example, of particles of an inorganic compound, such as an aluminum oxide or a lanthanoid-containing compound, fixed to particle surfaces of a lithium transition metal oxide. The lithium transition metal oxides may be used alone, or at least two types thereof may be used in combination.

As a metal element contained in the lithium transition metal oxide, for example, there may be mentioned nickel (Ni), cobalt (Co), manganese (Mn), aluminum (Al), boron (B), magnesium (Mg), titanium (Ti), vanadium (V), chromium (Cr), iron (Fe), copper (Cu), zinc (Zn), gallium (Ga), strontium (Sr), zirconium (Zr), niobium (Nb), Indium (In), tin (Sn), tantalum (Ta), or tungsten (W). As an example of a preferable lithium transition metal oxide, a composite oxide containing at least one type selected from Ni, Co, Mn, and Al may be mentioned.

As the electrically conductive agent contained in the positive electrode mixture layer 22, for example, there may be mentioned a carbon material, such as carbon black, acetylene black, Ketjen black, or graphite. As the binding agent contained in the positive electrode mixture layer 22, for example, there may be mentioned a fluorine resin, such as a polytetrafluoroethylene (PTFE) or a poly(vinylidene fluoride) (PVdF); a polyacrylonitrile (PAN), a polyimide resin, an acrylic resin, or a polyolefin resin. Those resins mentioned above each may be used together with a cellulose derivative, such as a carboxymethyl cellulose (CMC) or its salt, or a poly(ethylene oxide) (PEO).

[Negative Electrode]

As shown in FIGS. 2 and 3 by way of example, the negative electrode 30 includes the negative electrode collector 31 and at least one negative electrode mixture layer 32 formed on the negative electrode collector 31. As the negative electrode collector 31, for example, foil of a metal, such as copper, stable in a potential range of the negative electrode 30 or a film having a surface layer formed of the metal mentioned above may be used. The negative electrode mixture layer 32 contains a negative electrode active material and a binding agent. The negative electrode 30 may be formed by forming the negative electrode mixture layer 32 on each of two surfaces of the negative electrode collector 31, for example, in such a way that after a negative electrode mixture slurry containing the negative electrode active material, the binding agent, and the like is applied on the negative electrode collector 31 to form coating films, the coating films thus formed are dried and are then rolled.

The negative electrode mixture layer 32 includes a first mixture layer 33 primarily composed of a carbon-coated graphite 35 having a coating film of an amorphous carbon and a second mixture layer 34 primarily composed of a graphite 36 having particle surfaces which are coated with no amorphous carbon. The first mixture layer 33 is disposed at a surface side of the negative electrode mixture layer 32, and the second mixture layer 34 is disposed at a side of the negative electrode collector 31. The negative electrode mixture layer 32 is formed on each of the two surfaces of the negative electrode collector 31 and has a two-layer structure formed of the first mixture layer 33 and the second mixture layer 34.

Since the two-layer structure described above is applied to the negative electrode mixture layer 32, while a preferable adhesive property between the negative electrode mixture layer 32 and the negative electrode collector 31 is maintained, a preferable diffusion property of lithium ions can be obtained. Accordingly, a nonaqueous electrolyte secondary battery 10 having excellent discharge load characteristics and long-term cycle characteristics can be realized. That is, since the carbon-coated graphite 35 which is not likely to be crushed in a rolling step and which has an approximately spherical shape compared to that of the graphite 36 is disposed at the surface side of the negative electrode mixture layer 32, lithium ions can be preferably diffused to the inside of the negative electrode mixture layer 32, and in addition, since the graphite 36 is disposed at a portion in contact with the negative electrode collector 31, a preferable adhesive property between the negative electrode mixture layer 32 and the negative electrode collector 31 can be secured.

In addition, the primary component will be described using the first mixture layer 33 as an example. The primary component of the first mixture layer 33 indicates, among the components forming the first mixture layer 33, a component having a highest mass ratio. With respect to the total mass of the first mixture layer 33, the carbon-coated graphite 35 is preferably contained at a concentration of 50 percent by mass or more, more preferably 80 percent by mass or more, and particularly preferably 90 percent by mass or more. With respect to the total mass of the second mixture layer 34, the graphite 36 is preferably contained at a concentration of 50 percent by mass or more, more preferably 80 percent by mass or more, and particularly preferably 90 percent by mass or more.

In the negative electrode mixture layer 32, the second mixture layer 34 is preferably formed directly on the surface of the negative electrode collector 31, and between the negative electrode collector 31 and the first mixture layer 33, the second mixture layer 34 is preferably provided. The second mixture layer 34 is formed approximately all over the surface of the negative electrode collector 31 except for the exposing portion to be used for electrical connection to the negative electrode terminal 16. In addition, the first mixture layer 33 is formed directly approximately all over the surface of the second mixture layer 34.

The ratio in thickness of the first mixture layer 33 to the second mixture layer 34 is preferably 10:90 to 90:10 and more preferably 30:70 to 70:30. The ratio in thickness between the respective layers may be 40:60 to 60:40 or may also be 50:50. When the ratio in thickness between the respective layers is in the range described above, the discharge load characteristics and the long-term cycle characteristics of the battery can be easily simultaneously obtained. The thickness of the negative electrode mixture layer 32 (total thickness of the first mixture layer 33 and the second mixture layer 34) is at the one side of the negative electrode collector 31, for example, 50 to 150 μm and preferably 60 to 120 μm. For example, the thicknesses of the first mixture layer 33 and the second mixture layer 34 are each preferably 30 to 60 μm.

The carbon-coated graphite 35 is core-shell particles each containing a graphite 35a and an amorphous carbon coating film 35b formed on the surface of the graphite 35a. The amorphous carbon coating film 35b is a carbon coating film in an amorphous state or a fine crystalline state having a random structure, in each of which a graphite crystalline structure is not well developed, and for example, the amorphous carbon coating film 35b may be formed of a carbon having a lattice spacing d(002) of more than 0.340 nm which is measured by X-ray diffraction. The amorphous carbon coating film 35b is preferably formed over the entire surface of each particle of the graphite 35a. The amorphous carbon coating film 35b has, for example, functions of suppressing the decomposition of the electrolyte and improving the hardness of the carbon-coated graphite 35. As described above, the carbon-coated graphite 35 is hard as compared to the graphite 36 which is coated with no amorphous carbon and is not likely to be crushed in a rolling step.

As a particular example of the amorphous carbon coating film 35b, for example, there may be mentioned carbon black, such as hard carbon (hardly graphitizable carbon), soft carbon (easily graphitizable carbon), acetylene black, Ketjen black, thermal black, or furnace black; carbon fibers, or active carbon. One example of a preferable thickness range of the amorphous carbon coating film 35b is 10 to 200 nm. The thickness of the amorphous carbon coating film 35b can be measured by observation of a particle cross-section of the carbon-coated graphite 35 using a scanning electron microscope (SEM).

The amorphous carbon coating film 35b can be formed, for example, by a method in which the graphite 35a is mixed with coal tar, tar pitch, naphthalene, anthracene, and/or phenanthrene, followed by performing a heat treatment at a temperature of 800° C. to 1,200° C. or by a chemical vapor deposition method (CVD method) using a hydrocarbon gas or the like. The amorphous carbon coating film 35b is formed, for example, at a concentration of 0.5 to 15 percent by mass with respect to the mass of the carbon-coated graphite 35.

The graphites 35a and 36 may be either a natural graphite or an artificial graphite. For the graphites 35a and 36, the same graphite may be used. In addition, an artificial graphite may be used for the graphite 35a, and a natural graphite may be used for the graphite 36. In this case, the difference in hardness between the carbon-coated graphite 35 and the graphite 36 is further increased, and hence, the discharge load characteristics and the long-term cycle characteristics of the battery can be easily simultaneously obtained. The average particle diameters of the graphites 35a and 36 are, for example, 5 to 30 μm or 10 to 25 μm and may be approximately equivalent to each other. The average particle diameter of graphite particles is a volume average particle diameter measured by a laser diffraction method and indicates a median diameter at a volume cumulative value of 50% in the particle size distribution. In addition, since the thickness of the amorphous carbon coating film 35b is small, the particle diameter of the carbon-coated graphite 35 is approximately equivalent to the particle diameter of the graphite 35a.

In the negative electrode mixture layer 32, a negative electrode active material other than the graphite may also be contained. As the negative electrode active material other than the graphite, for example, there may be mentioned a metal, such as silicon (Si) or tin (Sn), forming an alloy with lithium or an oxide containing a metal element, such as Si or Sn. Among those mentioned above, a silicon oxide represented by $SiO_x$ is preferable. The content of the negative electrode active material other than the graphite, such as $SiO_x$, is with respect to the total mass of the negative electrode active material, preferably 10 percent by mass or less and more preferably 5 percent by mass or less.

When being contained in the negative electrode mixture layer 32, the negative electrode active material other than the graphite, such as $SiO_x$, may be contained in one of the first mixture layer 33 and the second mixture layer 34 but is preferably contained in the two layers described above. In addition, the contents of $SiO_x$ or the like in the two layers may be different from each other but are preferably approximately equivalent to each other.

The silicon oxide represented by $SiO_x$ has a structure in which, for example, fine particles of Si are dispersed in a matrix of amorphous $SiO_2$. On example of a preferable silicon oxide is $SiO_x$ ($0.5 \leq x \leq 1.6$). The silicon oxide represented by $SiO_x$ may contain a lithium silicate represented by $Li_{2y}SiO_{(2+y)}$ ($0<y<2$) and may have a structure in which fine particles of Si are dispersed in a lithium silicate phase.

On the particle surface of the silicon oxide represented by $SiO_x$, an electrically conductive film formed from a material having a higher electrically conductive property than that of the silicon oxide is preferably formed. As a material forming the electrically conductive film, at least one selected from a carbon material, a metal, and a metal compound is preferable. Among those mentioned above, a carbon material is particularly preferable, and the carbon material may be an amorphous carbon similar to that of the amorphous carbon coating film 35b. The electrically conductive film is formed, for example, at a concentration of 0.5 to 10 percent by mass with respect to the mass of the $SiO_x$ particle.

For the binding agent contained in the negative electrode mixture layer 32, as is the case of the positive electrode, for example, a fluorine resin, a PAN, a polyimide resin, an acryl resin, or a polyolefin resin may be used. When a mixture slurry is prepared using an aqueous solvent, for example, a CMC or its salt, a styrene-butadiene rubber (SBR), a poly(acrylic acid) (PAA) or its salt, or a poly(vinyl alcohol) is preferably used.

For the first mixture layer 33 and the second mixture layer 34, the same type binding agent may be used. The contents of the binding agent in the first mixture layer 33 and the second mixture layer 34 with respect to the total masses of the respective layers are each, for example, 0.5 to 5 percent by mass. The contents of the binding agent may be different between the first mixture layer 33 and the second mixture layer 34 or may be approximately equivalent to each other.

[Separator]

For the separator 40, a porous sheet having an ion permeability and an insulating property is used. As a particular example of the porous sheet, for example, a fine porous thin film, a cloth, or a non-woven cloth may be mentioned. As a material of the separator 40, for example, an olefin resin, such as a polyethylene or a polypropylene, or a cellulose is preferable. The separator 40 may have either a single layer structure or a laminate structure. On the surface of the separator 40, a heat resistant layer may also be formed.

EXAMPLES

Hereinafter, although the present disclosure will be further described with reference to Examples, the present disclosure is not limited to the following Examples.

Example 1

[Formation of Positive Electrode]

A positive electrode mixture slurry was prepared by mixing lithium cobalt oxide, a graphite, and a poly(vinylidene fluoride) (PVdF) at a mass ratio of 90:5:5, followed by addition of an appropriate amount of N-methyl-2-pyrrolidone (NMP). Subsequently, the slurry thus prepared was applied by a doctor blade method to one surface of a positive electrode collector formed of aluminum foil to have a thickness of 15 μm, and a coating film thus formed was dried. After a coating film was also formed on the other surface of the positive electrode collector, the coating films were rolled by a rolling machine, and the collector having two surfaces on which positive electrode mixture layers were formed was cut into an electrode size, so that a positive electrode was obtained.

[Formation of Negative Electrode Active Material]

As a graphite forming a negative electrode active material, a graphite A coated with an amorphous carbon and a graphite B (natural graphite) coated with no amorphous carbon were used. In addition, the graphite A and a silicon oxide represented by SiO were mixed together at a mass ratio of 94:6, so that a negative electrode active material A primarily composed of the graphite A was obtained. As was the case described above, the graphite B and SiO were mixed together at a mass ratio of 94:6, so that a negative electrode active material B primarily composed of the graphite B was obtained.

The graphite A was formed in such a way that after a graphite (artificial graphite) and a pitch were mixed together to adhere the pitch to particle surfaces of the graphite, firing was performed at 1,000° C. The amount of the amorphous carbon coating film measured using a simultaneous differential thermogravimetric analyzer was 1.5 percent by mass. In this measurement method, in an air atmosphere, a sample was heated from room temperature to 450° C. at a temperature increase rate of 15° C./min and from 450° C. to 600° C.

at a temperature increase rate of 5° C./min, and the amount of the amorphous carbon coating film was obtained from the formula of [reduction rate in mass at 600° C. (%)-reduction rate in mass at 100° C. (%)].

[Formation of Negative Electrode]

The negative electrode active material A, a sodium carboxymethyl cellulose (CMC-Na), and a styrene-butadiene rubber (SBR) were mixed together at a mass ratio of 100:1:1, followed by addition of an appropriate amount of water, so that a negative electrode mixture slurry A was prepared. As was the case described above, the negative electrode active material B, a CMC-Na, and a SBR were mixed together at a mass ratio of 100:1:1, followed by addition of an appropriate amount of water, so that a negative electrode mixture slurry B was prepared.

Next, on one surface of a negative electrode collector formed of copper foil having a thickness of 10 μm, the negative electrode mixture slurry B and the negative electrode mixture slurry A were sequentially applied by a doctor blade method from a collector side to form coating films. The application amounts of the respective slurries were adjusted so that the ratio in thickness between the coating films was 50:50. After the coating films were dried, on the other surface of the negative electrode collector, as was the case described above, the negative electrode mixture slurry B and the negative electrode mixture slurry A were sequentially applied from the collector side to form coating films, and the coating films thus formed were dried. Next, negative electrode mixture layers were rolled by a rolling machine, and the collector having two surfaces on which the negative electrode mixture layers were formed was cut into an electrode size, so that a negative electrode was obtained. The negative electrode mixture layer has a two-layer structure including a first mixture layer formed using the negative electrode mixture slurry A and a second mixture layer formed using the negative electrode mixture slurry B. The first mixture layer was disposed at a surface side of the negative electrode mixture layer, and the second mixture layer was disposed at a collector side.

In addition, the application amounts of the positive electrode mixture layer and the negative electrode mixture layer were adjusted so that at a charge voltage used as a design standard, a charge capacity ratio (negative electrode charge capacity/positive electrode charge capacity) at 4.2 V was 1.1 at a portion at which the positive electrode and the negative electrode faced each other.

[Preparation of Nonaqueous Electrolyte]

Ethylene carbonate (EC), propylene carbonate (PC), and ethyl methyl carbonate (EMC) were mixed together at a volume ratio of 10:10:80. In this mixed solvent, $LiPF_6$ was dissolved to have a concentration of 1 mol/L, so that a nonaqueous electrolyte was prepared.

[Formation of Battery]

The positive electrode and the negative electrode were spirally wound with separators interposed therebetween, the separators each being formed of a polyethylene-made fine porous film, and after a polypropylene-made tape was adhered to the outermost circumference, a wound body thus formed pressed, so that a flat winding type electrode body was formed. Next, in a glove box in an argon atmosphere, the electrode body was inserted in an exterior body formed of laminate sheets each having a five-layer structure of a polypropylene layer/an adhesive layer/an aluminum alloy layer/an adhesive layer/a polypropylene layer, and the nonaqueous electrolyte was then charged therein.

Subsequently, the inside of the exterior body was vacuumed to infiltrate the nonaqueous electrolyte in the electrode body, and an opening portion of the exterior body was then sealed, so that a nonaqueous electrolyte secondary battery having a height of 62 mm, a width of 35 mm, and a thickness of 3.6 mm was formed.

Example 2

Except for that in the formation of the negative electrode, the application amounts of the respective negative electrode mixture slurries were changed so that the ratio in thickness of the first mixture layer to the second mixture layer, which collectively formed the negative electrode mixture layer, was 70:30, a negative electrode and a battery were formed by a method similar to that of Example 1.

Example 3

Except for that in the formation of the negative electrode, the application amounts of the respective negative electrode mixture slurries were changed so that the ratio in thickness of the first mixture layer to the second mixture layer, which collectively formed the negative electrode mixture layer, was 30:70, a negative electrode and a battery were formed by a method similar to that of Example 1.

Comparative Example 1

Except for that in the formation of the negative electrode, a negative electrode mixture slurry prepared by mixing the negative electrode active materials A and B at a mass ratio of 50:50 was only used to form a negative electrode mixture layer having a single layer structure, a negative electrode and a battery were formed by a method similar to that of Example 1. In addition, the negative electrode mixture layer was adjusted so as to have a thickness approximately equivalent to the thickness of the negative electrode mixture layer of Example 1 (the same as described above was also performed in the following Comparative Examples).

Comparative Example 2

Except for that in the formation of the negative electrode, a negative electrode mixture layer having a single layer structure was formed using only the above negative electrode mixture slurry A, a negative electrode and a battery were formed by a method similar to that of Example 1.

Comparative Example 3

Except for that in the formation of the negative electrode, a negative electrode mixture layer having a single layer structure was formed using only the above negative electrode mixture slurry B, a negative electrode and a battery were formed by a method similar to that of Example 1.

Comparative Example 4

Except for that in the formation of the negative electrode, the first mixture layer was disposed at a negative electrode collector side, and the second mixture layer was disposed at a surface side of the negative electrode mixture layer, a negative electrode and a battery were formed by a method similar to that of Example 1.

A performance evaluation was performed on the negative electrodes and the batteries described above by the following method. As an evaluation result, a relative value with respect to the value of Comparative Example 1 which is regarded as the standard (100) is shown in Table 1.

[Peeling Strength Test]

A double-faced adhesive tape was adhered to a horizontal surface, and the negative electrode mixture layer was adhered to the double-faced adhesive tape. A portion of the negative electrode which was not adhered to the double-faced adhesive tape was pulled by a tensile test machine at a predetermined rate in a direction at an angle of 90° with respect to the horizontal surface, and a load at which the mixture layer was peeled away from the collector was measured as a peeling strength.

[Infiltration Property Test]

After 3 μL of propylene carbonate (PC) was dripped on the surface of the negative electrode mixture layer, an elapsed time until PC was infiltrated in the mixture layer was measured, and an infiltration property of an electrolyte liquid to the negative electrode mixture layer was evaluated. As the elapsed time is shorter, the infiltration property of the electrolyte liquid is more preferable, and hence, the diffusion property of lithium ions is excellent.

[Discharge Load Characteristics]

At 25° C., after the battery was charged at a constant current of 800 mA until the battery voltage reached 4.2 V and was then charged at a constant voltage until a final current reached 40 mA, constant current discharge was performed at 800 mA until the voltage reached 2.75 V, and the capacity at this stage was regarded as a 1 C discharge capacity. In addition, as was the case described above, after the charge was performed to a voltage of 4.2 V, a constant current discharge was performed at a current of 2,400 mA until the voltage reached 2.75 V, and the capacity at this stage was regarded as a 3 C discharge capacity. The ratio of the 3 C discharge capacity to the 1 C discharge capacity was called the discharge load characteristics.

Discharge Load Characteristics . . . (3 C discharge capacity)/(1 C discharge capacity)

[Cycle Characteristics (Capacity Retention Rate)]

At 25° C., after the battery was charged at a constant current of 800 mA until the battery voltage reached 4.2 V and was further charged at a constant voltage until the final current reached 40 mA, constant current discharge was performed at 800 mA until the voltage reached 2.5 V. The process described above was regarded as one cycle and was repeatedly performed 300 cycles, and the ratio of the discharge capacity at a $300^{th}$ cycle to the discharge capacity at the first cycle of the battery was obtained as a discharge retention rate.

As shown in Table 1, compared to the negative electrode of Comparative Example 1 including the mixture layer having a single layer structure which contains the negative electrode active materials A and B, any one of the negative electrodes of Examples has, besides a high peeling strength and an excellent adhesive property between the mixture layer and the collector, an excellent infiltration property of the electrolyte liquid, and hence, the diffusion property of lithium ions is excellent. The results of Examples 1 to 3 indicate that even when the ratio in thickness between the first mixture layer containing the negative electrode active material A primarily composed of the graphite A and the second mixture layer containing the negative electrode active material B primarily composed of the graphite B is changed from 30:70 to 70:30, effects equivalent to each other can be obtained. In addition, although the negative electrode of Comparative Example 2 which only uses the negative electrode active material A is excellent in infiltration property of the electrolyte liquid, the peeling strength is low, and on the other hand, although the negative electrode of Comparative Example 3 which only uses the negative electrode active material B is excellent in peeling strength, the infiltration property of the electrolyte liquid is inferior. The negative electrode of Comparative Example 4 in which the second mixture layer is disposed at the surface side of the negative electrode mixture layer, and the first mixture layer is disposed at the collector side, this arrangement being opposite to that of each Example, has a low peeling strength, and the infiltration property of the electrolyte liquid is also inferior. Only when the negative electrode of each Example, which has a high peeling strength and an excellent infiltration property of the electrolyte liquid, is used, a nonaqueous electrolyte secondary battery in which the two characteristics, that is, the discharge load characteristics and the long-term cycle characteristics, are both improved can be obtained.

REFERENCE SIGNS LIST 10 nonaqueous electrolyte secondary battery, 11 exterior body, 12 electrode body, 13 receiving portion, 14, sealing portion, 15 positive electrode terminal, 16 negative electrode terminal, 20 positive electrode, 21, positive electrode collector, 22, positive electrode mixture layer, 30 negative electrode, 31 negative electrode collector, 32 negative electrode mixture layer, 33 first mixture layer, 34 second mixture layer, 35 carbon-

TABLE 1

| | NEGATIVE ELECTRODE ACTIVE MATERIAL | | | | | |
|---|---|---|---|---|---|---|
| | SURFACE SIDE LAYER | CORE SIDE LAYER | PEELING STRENGTH | INFILTRATION PROPERTY | DISCHARGE LOAD CHARACTERISTICS | CYCLES |
| COMPARATIVE EXAMPLE 1 | MIXTURE OF A AND B (SINGLE LAYER) | | 100 | 100 | 100 | 100 |
| COMPARATIVE EXAMPLE 2 | A (SINGLE LAYER) | | 60 | 70 | 104 | 95 |
| COMPARATIVE EXAMPLE 3 | B (SINGLE LAYER) | | 180 | 200 | 87 | 86 |
| EXAMPLE 1 | A | B | 160 | 80 | 103 | 107 |
| EXAMPLE 2 | A | B | 153 | 73 | 102 | 102 |
| EXAMPLE 3 | A | B | 168 | 86 | 100 | 104 |
| COMPARATIVE EXAMPLE 4 | B | A | 70 | 180 | 90 | 93 | coated graphite, 35a, 36 graphite, 35b amorphous carbon coating film, 40 separator

The invention claimed is:

1. A negative electrode for a nonaqueous electrolyte secondary battery, the negative electrode comprising a negative electrode collector and a negative electrode mixture layer formed on the negative electrode collector,
    wherein the negative electrode mixture layer includes a first mixture layer primarily composed of a graphite coated with an amorphous carbon and a second mixture layer primarily composed of a graphite coated with no amorphous carbon,
    the first mixture layer is disposed at a surface side of the negative electrode mixture layer and the second mixture layer is disposed at a side of the negative electrode collector,
    the graphite coated with no amorphous carbon is a natural graphite, and
    the first mixture layer and the second mixture layer contain a silicon oxide represented by $SiO_x$ ($0.5 \leq x \leq 1.36$), wherein a concentration of the silicon oxide in the first mixture layer is approximately equivalent to a concentration of the silicon oxide in the second mixture layer.

2. The negative electrode for a nonaqueous electrolyte secondary battery according to claim 1,
    wherein a ratio in thickness of the first mixture layer to the second mixture layer is 30:70 to 70:30.

3. The negative electrode for a nonaqueous electrolyte secondary battery according to claim 1,
    wherein the graphite coated with the amorphous carbon is an artificial graphite.

4. The negative electrode for a nonaqueous electrolyte secondary battery according to claim 1,
    wherein the graphite coated with the amorphous carbon is a natural graphite.

5. The negative electrode for a nonaqueous electrolyte secondary battery according to claim 1,
    wherein the amorphous carbon forms a coating film having a thickness of from 10 nm to 200 nm.

6. A nonaqueous electrolyte secondary battery comprising:
    the negative electrode according to claim 1; a positive electrode; and a nonaqueous electrolyte.

* * * * *